United States Patent
Blair et al.

(10) Patent No.: US 11,305,455 B2
(45) Date of Patent: Apr. 19, 2022

(54) XEROGRAPHIC 3D PRINTING METHOD FOR FORMING SHAPED OBJECTS

(71) Applicant: Xerox Corporation, Norwalk, CT (US)

(72) Inventors: Christopher D. Blair, Webster, NY (US); David C. Irving, Avon, NY (US)

(73) Assignee: XEROX CORPORATION, Norwalk, CT (US)

( * ) Notice: Subject to any disclaimer, the term of this patent is extended or adjusted under 35 U.S.C. 154(b) by 296 days.

(21) Appl. No.: 16/139,459

(22) Filed: Sep. 24, 2018

(65) Prior Publication Data
US 2020/0094436 A1 Mar. 26, 2020

(51) Int. Cl.
| | |
|---|---|
| *B28B 1/00* | (2006.01) |
| *C04B 35/64* | (2006.01) |
| *C04B 35/638* | (2006.01) |
| *B22F 3/10* | (2006.01) |
| *B29C 64/147* | (2017.01) |
| *B33Y 70/00* | (2020.01) |
| *B33Y 10/00* | (2015.01) |
| *B33Y 30/00* | (2015.01) |

(52) U.S. Cl.
CPC ............ *B28B 1/001* (2013.01); *B22F 3/1021* (2013.01); *B29C 64/147* (2017.08); *C04B 35/638* (2013.01); *C04B 35/64* (2013.01); *B33Y 10/00* (2014.12); *B33Y 30/00* (2014.12); *B33Y 70/00* (2014.12)

(58) Field of Classification Search
None
See application file for complete search history.

(56) References Cited

U.S. PATENT DOCUMENTS

| | | | |
|---|---|---|---|
| 8,674,018 B2 | 3/2014 | Maat et al. | |
| 9,162,927 B2 | 10/2015 | Maat et al. | |
| 2007/0128531 A1* | 6/2007 | Schultheis | .............. C03C 17/04 |
| | | | 430/108.23 |
| 2012/0235330 A1* | 9/2012 | ter Maat | ........... C04B 35/63408 |
| | | | 264/645 |
| 2016/0082658 A1* | 3/2016 | Swartz | .................. B29C 64/147 |
| | | | 264/162 |
| 2018/0186058 A1 | 7/2018 | Busgen et al. | |
| 2019/0054685 A1* | 2/2019 | Zimmer | ................ B29C 64/182 |

FOREIGN PATENT DOCUMENTS

WO    WO 94/025205    11/1994

OTHER PUBLICATIONS

Liu et al., Metal and Ceramic Components made via CAM-LEM Technology, 1996 International Solid Freeform Fabrication Symposium, http://hdl.handle.net/2152/70260 (Year: 1996).*
BASF Aktiengesellschaft, "Catamold® Feedstock for Metal Injection Molding: Processing-Properties—Applications," pp. 1-13, May 2003, available at www.catamold.de.

* cited by examiner

*Primary Examiner* — Matthew J Daniels
*Assistant Examiner* — Paul Spiel
(74) *Attorney, Agent, or Firm* — Fay Sharpe LLP

(57) ABSTRACT

A shaped ceramic or metallic object is formed by sectioning a model of a shaped body into 2-dimensional slices. For each slice, a toner material is electrostatically printed on a polymer sheet. The toner material includes solid particles. The printed sheets are assembled into a stack and the stack is depolymerized and sintered to form the ceramic object.

18 Claims, 4 Drawing Sheets

XEROGRAPHIC 3D PRINTING METHOD FOR FORMING SHAPED OBJECTS

BACKGROUND

The exemplary embodiment relates to creation of three-dimensional (3D) objects. It finds particular application in connection with systems and methods for 3D printing of ceramic materials using xerographic printing techniques.

Ceramic objects are conventionally formed by sintering inorganic particles, mixed with a binder, to a high temperature. Additive manufacturing methods have been developed for producing ceramic pieces and are useful for prototyping and producing fully dense ceramic parts rapidly. There are several problems with this approach. Powders need to be shaped and held together for high temperature firing. Typically, specialized firing schedules are used to remove the polymeric binder used to hold the powders together. However, carbon contamination is problematic when pyrolyzing binders, leading to lowered properties. Most existing methods cannot produce complex geometry and are limited by speed and tooling cost.

Xerography, also known as electrophotography, is a printing and photocopying technique that works on the basis of electrostatic charges. Aspects of the exemplary embodiment relate to a method and apparatus for xerographic printing of ceramic objects which overcomes some or all of these problems.

INCORPORATION BY REFERENCE

U.S. Pub. No. 20070128531A1, published Jun. 7, 2007, entitled NON-MAGNETIC, CERAMIC ONE-COMPONENT TONER, by Schultheis, et al., describes a non-magnetic, ceramic one-component toner which is transferred onto a glass, glass ceramics or ceramics substrate or a similar solid or flexible substrate by electrophotographic printing and is burnt into in a subsequent temperature process. The one-component toner includes a synthetic matrix and a portion of substantially inorganic foreign matter.

U.S. Pub. No. 20180186058A1, published Jul. 5, 2018, entitled METHOD FOR PRODUCING 3-D OBJECTS, by Busgen, et al., describes a building up layers curing the assembly into a three-dimensional object by means of deep-drawing or thermoforming. The layers may be formed of a hardenable polymer or reactive resin, such as a thermoplastic, and may include inorganic or ceramic reinforcing particles.

U.S. Pat. No. 9,162,927, issued Oct. 20, 2015, entitled PROCESS FOR PRODUCING METALLIC OR CERAMIC SHAPED BODIES, by ter Maat, et al., describes producing a metallic or ceramic shaped body from a thermoplastic material comprising: A) 40 to 65% by volume of at least one inorganic sinterable powder A; B) 35 to 60% by volume of a mixture of $B_1$ 50 to 95% by weight of one or more polyoxymethylene homo- or copolymers; $B_2$ 5 to 50% by weight of a polymer homogeneously dissolved in $B_1$ or dispersed in $B_1$ with a mean particle size of less than 1 µm, as a binder, and C) 0 to 5% by volume of a dispersing aid, by injection molding or extrusion to give a green body, removing the binder and sintering.

U.S. Pat. No. 8,674,018, issued Mar. 18, 2014, entitled BINDER AND PROCESS FOR PRODUCING METALLIC OR CERAMIC MOLDINGS IN POWDER INJECTION MOLDING, by ter Maat, et al., describes binders for pulverulent metals, metal alloys or ceramics based on polyacetals, polyethers and polyesters, to thermoplastic compositions comprising these binders for the production of metallic or ceramic moldings, to the use thereof and to processes for production of moldings therefrom.

BRIEF DESCRIPTION

In accordance with one aspect of the exemplary embodiment, a method for forming a shaped object includes sectioning a model of a shaped body into 2-dimensional slices. For each slice, a toner material is electrostatically printed on a polymer sheet. The toner material includes particles which form a ceramic or metal when sintered to form the shaped object. The printed sheets are assembled into a stack and the stack of printed sheets is depolymerized and sintered to form the shaped object.

In accordance with another aspect of the exemplary embodiment, an apparatus for forming a stack of printed sheets for forming a shaped object includes memory which stores 2-dimensional slices formed by sectioning a model of a shaped body. A xerographic marking engine, for each slice, prints a toner material on a polymer sheet, the toner material comprising at least one of ceramic-forming particles, metal particles, and metal-forming particles for forming the shaped object. A stacker component assembles the printed sheets into a stack, whereby when the stack is depolymerized and sintered, the shaped object is formed.

In accordance with another aspect of the exemplary embodiment, a method for forming a shaped object includes providing a print file in which a model of a ceramic body has been sectioned into 2-dimensional slices. For each slice, a toner material is printed on a polymer sheet. The toner material includes at least 40 wt. % ceramic-forming particles and a binder including a polymer. The printed sheets are assembled into a stack and the stack is depolymerized and sintered to form the ceramic object.

DETAILED DESCRIPTION

Aspects of the exemplary embodiment relate to a method and apparatus for forming a shaped object, such as a ceramic or metallic object. The method enables ceramic and metallic articles to be printed in a sheetwise fashion using a xerographic printer. The printed sheets are stacked to form a multilayer assembly. Depolymerization of the stack and sintering of the residual particles, results in the formation of the shaped object.

The terms "printer" or "printing apparatus," as used herein, encompass any apparatus, such as a digital copier, bookmaking machine, facsimile machine, multi-function machine, etc., which performs a print outputting function for any purpose. A "xerographic printer" (or electrophotographic printer) is a printer that operates on the basis of electrostatic charges to transfer a dry toner material to a photoconductive surface, and from the photoconductive surface (directly or indirectly) to a sheet of print media.

Figure 1:
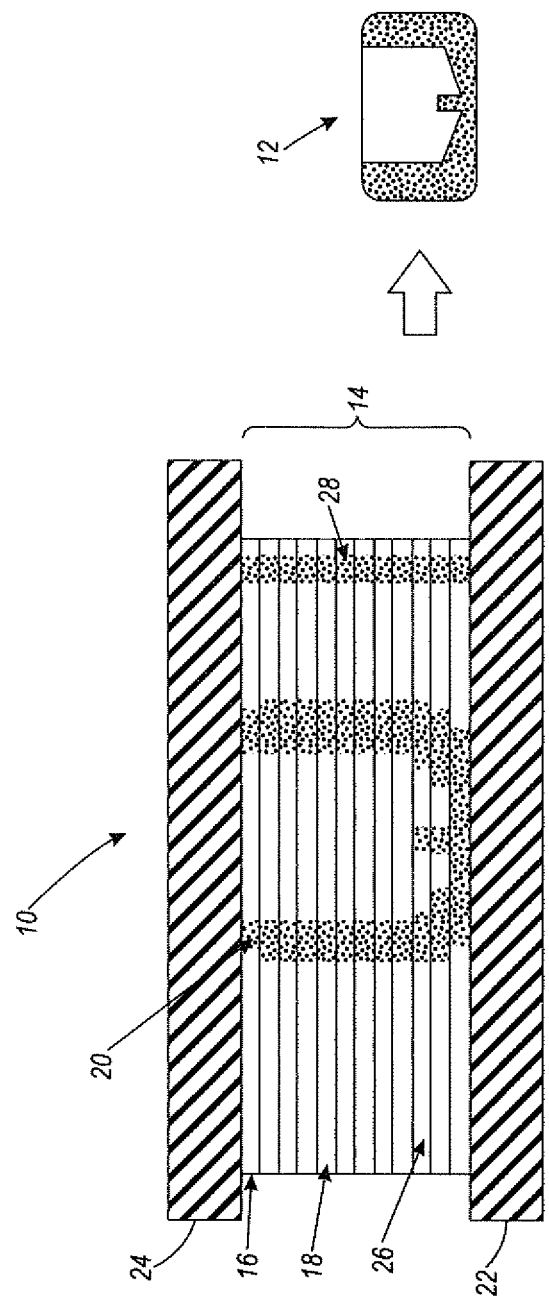
FIG. 1 is a side sectional view of an assembly for forming a shaped, ceramic object in accordance with one aspect of the exemplary embodiment.

With reference to FIG. 1, a multilayer assembly 10 for forming a shaped object 12, such as a ceramic or metallic object, is shown (not to scale). The assembly 10 includes a stack 14 of layers 16, 18, etc., one on top of the other, such as at least 5 or at least 10, or at least 20 layers. The layers 16, 18 are formed from a polymeric material. Solid particles 20, such as ceramic-forming particles, metal particles, and/or metal-forming particles, are supported by, e.g., at least partially embedded in, some or all of the layers 16, 18. The solid particles 20 in the layers result from xerographic printing of the layers with toner containing the particles, as discussed in further detail below. By "ceramic-forming," it is meant that the particles 20 form a ceramic object 12, when sintered. By "metal-forming," it is meant that the particles 20 form a metallic object 12, when sintered.

The stack 14 of layers may be supported on a rigid support member 22. The support member 22 may be formed of a heat-resistant material, such as a ceramic or metal plate. A top member 24 may be positioned on the top layer 16, so that pressure can be distributed evenly across the layers during formation of the shaped object 12. In some embodiment, additional structures 26, 28 are created from the solid particles 20. These may be in the shape of pillars extending vertically, e.g., from the top layer to the bottom layer of the stack. The illustrated structures 26, 28 are located around the edges of the layers to reduce the risk of damage to the shaped object during formation. They can be disposed of when no longer needed.

The polymeric material forming the layers 16, 18 is one which is removable from the stack 14, for example in a thermal and/or chemical depolymerization process. Examples of such polymeric materials include polyoxymethylene (also known as acetal, polyacetal, and polyformaldehyde); polyvinyl alcohol; polystyrene (PS) and styrene copolymers, such as acrylonitrile-butadiene-styrene (ABS); polyvinyl acetals, such as polyvinyl butyral; unsaturated and saturated polycarbonates; polyvinylpyrrolidone (PVP); vinyl imidazole copolymers, such as 1-vinylimidazole; polyamides, such as aliphatic polyamides, polyphthalamides, and aramids; polyethers and polyesters, e.g., polyethylene terephthalate (PET), polybutylene terephthalate, poly(lactic acid) (PLA); cyclic olefin copolymers (COC), such as ethylene-norbornene copolymer; polyolefins, such as polypropylene (PP) and polyethylene (PE); polyacrylates and methacrylates, such as poly(methyl methacrylate) (PMMA); polyacrylonitrile (PAN); and copolymers and mixtures thereof. However, any polymeric material which can be suitably removed in a depolymerization process can be used.

By way of example, polyoxymethylene (POM) is commercially available in sheet form with a thickness of about 50 microns. Copolymer and homopolymer forms of POM are available and may be used. Polyoxymethylene homopolymers are of the general form $(CH_2O)_n$, where n may be at least 10 or at least 50, or at least 100, such as up to 1000 or more, by number average. In the polyoxymethylene copolymer, some of the —$CH_2O$— units are replaced with —$CH_2CH_2O$— (e.g., about 1-1.5%). Thus, in the copolymer structure, polyoxymethylene (—C—O) and carbon-carbon (—C—C— bond) comonomer groups are incorporated into the main chain. In some cases, other monomers may be incorporated into POM polymer chain, as minor components (e.g., at less than 10 mol. %, or less than 5 mol. %, in total). As used herein, POM polymers have at least 50 mol. % or at least 70 mol. %, or at least 90 mol. % or at least 95 mol. % of —$CH_2O$— units in the main polymer chain.

Example thermoplastic POM polymers include polyoxymethylene homopolymers, sold under the tradenames Delrin® from Dupont, and Ramtal® from Polyram Group and POM copolymers, sold under the tradenames Hostaform® and Celcon® from Celanese Corp., Duracon® from Polyplastics Co., and Kepital® from Korea Engineering Plastics Co. Typically, the hemiacetal ends of the polyoxymethylene polymer are stabilized, e.g., through reaction with acetic anhydride.

The POM homopolymer or copolymer may have a melting point in the range of 160-195° C., such as from 170-190° C. POM polymers can be removed from the stack 14 by chemical depolymerization.

The thickness of the layers 16, 18 depends, to some extent, on the type of polymer. Sheets of polymeric material should be sufficiently flexible yet strong enough to pass through a xerographic printer without breaking or causing jams. Additionally, the sheet thickness is desirably sufficient to allow the particles 20 to be substantially or completely embedded in the sheets. For example, the thickness of the sheet is greater than the average diameter d of the particles 20. The thickness of the layers 16, 18 may be, for example, at least 20 microns (µm), or at least 40 µm and/or up to 200 µm, or up to 150 µm.

Suitable inorganic ceramic-forming particles 20 include refractory materials, such as oxides, nitrides, carbides, hydroxides, silicates, and mixtures thereof. Examples include alumina ($Al_2O_3$), aluminum hydroxide ($AlOH_3$), aluminum nitride (AlN), silica ($SiO_2$), titanium dioxide ($TiO_2$), calcium oxide (CaO), magnesium oxide (MgO), barium oxide (BaO), zirconia ($ZrO_2$), silicon carbide (SiC), silicon nitride ($Si_3N_4$), boron carbide ($B_4C$), precursors which decompose on heating to form such refractory materials, and mixtures and compounds thereof. In general, while other materials may be present in minor amounts, the ceramic-forming particles 20 consist of at least 80 wt. % or at least 90 wt. % or at least 95 wt. % or up to 100 wt. % of one or more of such refractory materials. In one embodiment, alumina may be at least 50 wt. % of the ceramic forming particles 20 in the stack and/or the ceramic object 12 may be at least 50 wt. % alumina.

The ceramic particles 20 may be produced via flame spray or other known processes.

Suitable metal particles and metal-forming particles 20 include metals, mixtures of metals, metal alloys and compounds which decompose to form metals during processing. Examples include titanium, titanium alloys, iron-nickel alloys, stainless steel (e.g., iron-chromium-molybdenum alloy), tungsten, chromium-molybdenum alloys, and mixtures thereof. The metal particles should be non-magnetic, to avoid being retained in the developer housing.

The ceramic or metal particles 20, prior to forming the toner material, may be microspheres (average particle diameter by volume of greater than 1 micron) or nanoparticles (average particle diameter by volume of less than 1 micron). As used herein particle diameter is expressed as average particle diameter by volume, $D_{50}$, as measured in an electrolyte under an electric field with a Coulter counter obtainable from Beckman Coulter, Inc. The $D_{50}$ is the diameter at which 50% of a sample's volume is composed of smaller particles. During forming of the toner material, the particle size may be reduced, e.g., through blending the particles with other toner components.

Figure 2:
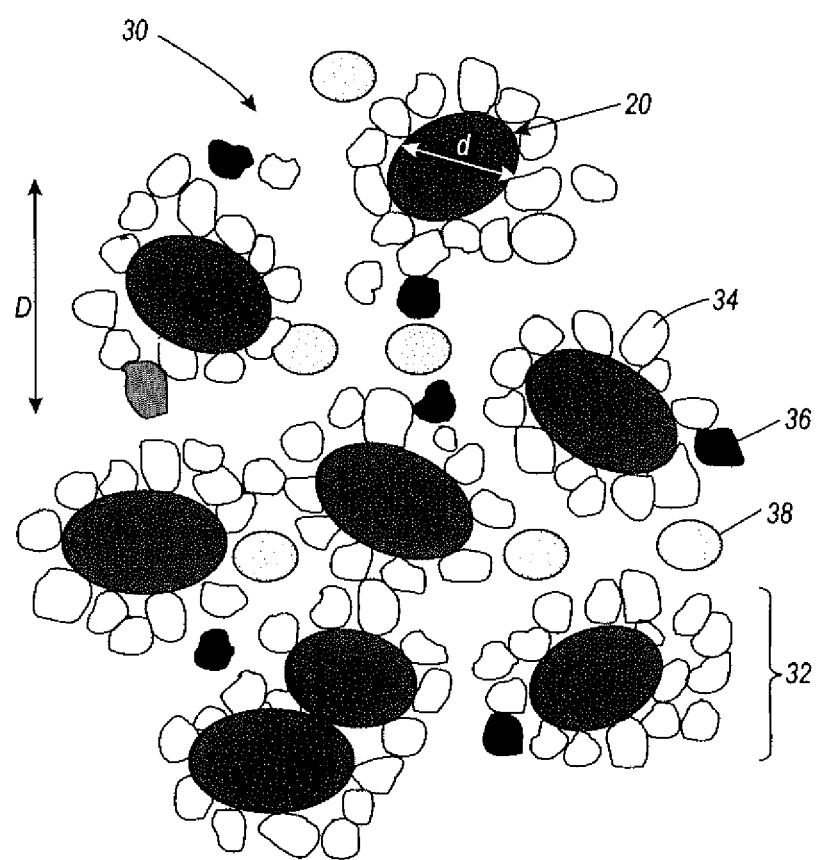
FIG. 2 illustrates a toner material for use in forming a shaped, ceramic object.

The particles 20 are applied to the sheets in a toner material 30, as illustrated schematically in FIG. 2. In addition to the particles 20, the toner material includes one or more other materials which serve(s) as a binder, flow control aid, and/or charge control agent. Such binder materials may include one or more of the polymers listed above as being suitable for the substrate, such as the same polymer. For example, the particles 20 are blended with the polymer(s), and optionally one or more other additives, at high shear to form toner clusters 32, in which one or more of the particles 20 is aggregated with organic polymer material 34. The polymer material 34, here illustrated as grains, adheres to the particles 20 by electrostatic forces. Polymer grains 34 may be derived, for example, from POM polymer. The other additives may be present in the polymer grains 34 or form separate grains 36. For example, grains 36 may be derived from a charge control agent, such as another organic polymer (e.g., a styrene-acrylate-methacrylate terpolymer), a quaternary ammonium salt (e.g., tetraalkylammonium perchlorate), or azine compound. The charge control agent acts to decrease or increase the triboelectric charge of the toner to a suitable range, such as 20-50 microcoulombs per gram ($\mu Cg^{-1}$). The type of charge control agent and amount used depends on the charge of the polymer(s) used in grains 34.

As a flow control aid, a small amount of wax can be used, such as polymethylmethacrylate (PMMA), polyvinyl alcohol (PVA) or carnauba wax. The wax pyrolyzes during firing but is typically of such a small loading that the carbon residue is negligible.

The toner clusters 32 may be spherical or oblate and may have an average diameter D of 1-12 μm, such as 4-10 μm, or other suitable size for deposition in a xerographic printer. The average diameter d ($D_{50}$) of each of the toner particles 30 in the clusters is thus less than D, i.e., less than 12 μm, such as no more than 10 μm, or no more than 8 μm. While in the developer housing, the toner material 30 may include magnetic particles 38 to assist in mixing the toner material. The magnetic particles are retained in the developer housing and are not deposited on the polymer sheets.

The toner material 30 (excluding the magnetic particles 38) may contain at least 40 wt. % of the particles 20, or at least 50 wt. % or at least 60 wt. %, or at least 70 wt. %, or at least 80 wt. % of ceramic-forming and/or metal/metal-forming particles. In some embodiments the particles may be up to 90 wt. %, or greater, of the toner material 30. The binder materials 34, 36 may make up the balance, with the charge control agent 36 and flow control agent being present in relatively minor amounts, as needed. The binder material may thus be at least 5 wt. %, and up to 60 wt. wt. of the toner material. For example, the charge control agent may be at least 0.05 wt. %, such as up to 5 wt. %, or up to 2 wt. % of the toner material. The flow control aid may be up to 3 wt. %, or up to 1 wt. % of the toner material, such as at least 0.05 wt. %.

While conventional toner pigments may not survive sintering, in some embodiments, the ceramic-forming particles may be selected to impart color to the ceramic body 12.

To form the toner material 30, ceramic-forming or other solid particles 20 are mixed and milled with the binder material. The composite material can be extruded and crushed in a manner similar to conventional toner-forming processes. The resulting composite particles are sieved and classified to produce a toner material of a particle (cluster) diameter D of, for example, between 4 and 10 microns.

Figure 3:
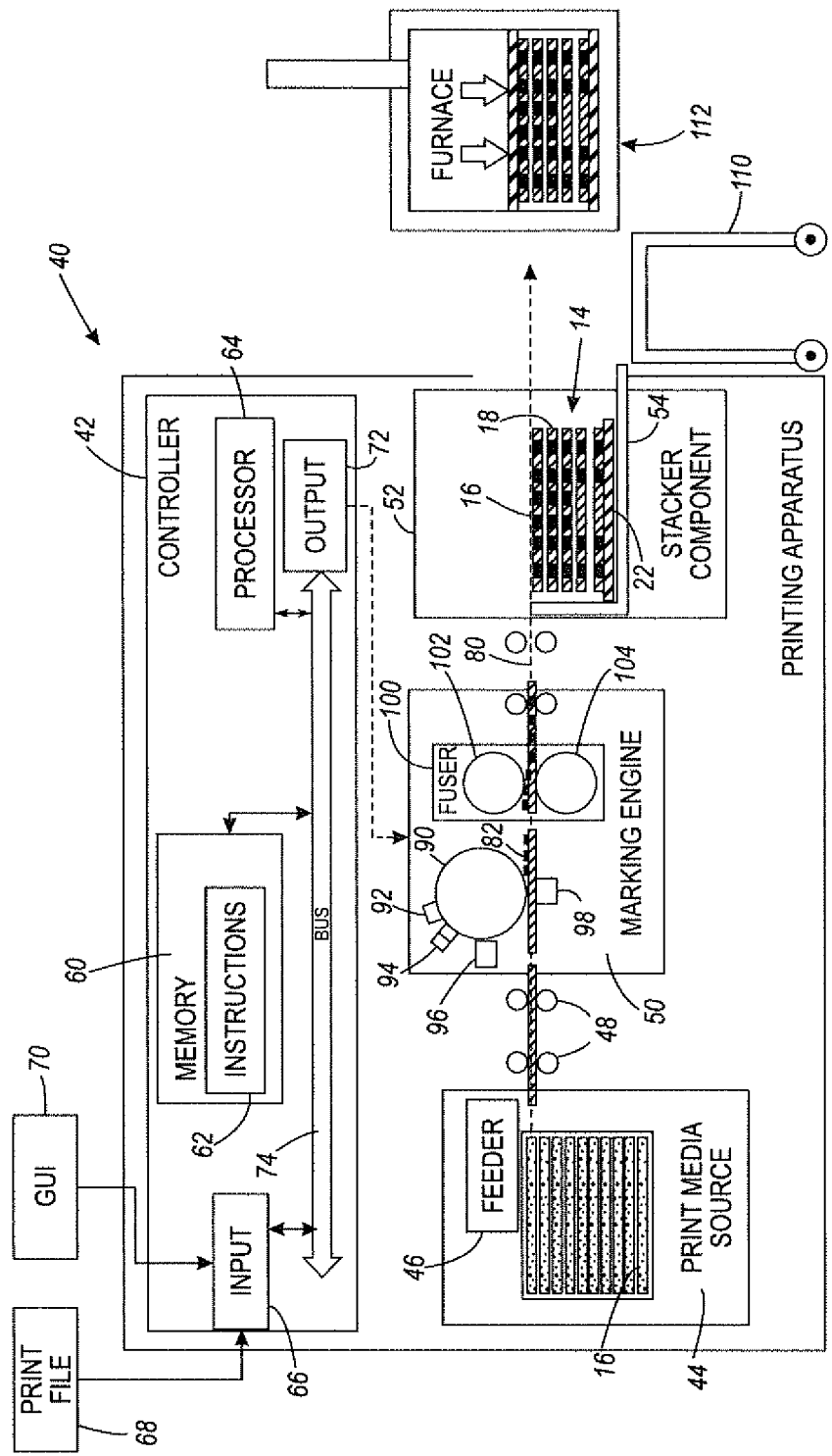
FIG. 3 illustrates a printing apparatus for forming a stack of layers for forming a shaped object in accordance with another aspect of the exemplary embodiment.

FIG. 3 illustrates an electrostatic printing apparatus 40 for forming the stack 14 of FIG. 1. The apparatus includes a controller 42, a print media source 44 which holds a supply of transparent sheets to serve as the polymer layers 16, 18, a sheet feeder 46, a transport mechanism 48, a xerographic (electrophotographic) marking engine 50, a stacker component 52, and an output device 54, such as a tray.

The controller 42 includes memory 60, which stores instructions 62 for receiving a three-dimensional model of a shaped body, sectioning the model into a set of layers, and generating and outputting instructions for sequentially forming the layers by printing toner 30 onto the sheets to form toner images. A processor 64, in communication with the memory, executes the instructions. The controller may include an input device 66 for receiving a print file 68 containing the 3D model, and/or information from a user, e.g., via a graphical user interface (GUI) 70. The controller includes an output device 72 for sending instructions to the marking engine 50 (and other components of the apparatus 40) for rendering the toner images sequentially on the sheets and stacking the printed sheets to form a stack 14. Hardware components 60, 64, 66, 72 of the controller 42 may be communicatively connected by a data/control bus 74. As will be appreciated, the controller 42, or parts thereof, may be remote from the rest of the printing apparatus 40, e.g., on a remote server.

The feeder 46 supplies the polymer sheets 16 from the source 44 to the transport system 48, which may be composed of rollers, conveyor belts, or the like. The transport system 48 conveys the sheets 16 downstream from the feeder 46, along a print media path 80 to the xerographic marking engine 50. In the marking engine, each sheet is printed with a respective toner image 82, using the toner material 30. The exemplary marking engine 50 is a monochrome (single color) marking device, employing a single toner material 30, as described herein. However, a marking engine or sequence of marking engines which allow for printing of more than one toner material 30 (e.g., toner materials containing different compositions of ceramic-forming and/or metal particles) on the same or different sheets may alternatively be used.

The marking engine 50 includes suitable hardware elements employed in the creation of desired images by electrophotographic processes. The exemplary marking engine includes a charge retentive surface, such as a rotating photoreceptor 90 in the form of a belt or drum. The toner image 82 is created on a surface of the photoreceptor. Disposed at various points around the circumference of the photoreceptor 90 are xerographic subsystems which may include a charging station 92, such as a charging corotron, for each of the toner materials to be applied (one in the case of a monochrome printer), an exposure station 94, which forms a latent image on the photoreceptor, a developer unit 96, associated with each charging station for developing the latent image formed on the surface of the photoreceptor by applying toner material 30 to obtain a toner image. A transferring unit 98, such as a transfer corotron and/or intermediate transfer belt, transfers the toner image 82 thus formed to the surface of the polymer sheet 16 as it passes between the transferring unit and the photoreceptor. A fuser 100 more permanently attaches the toner image 82 to the sheet. In one embodiment, the fuser, which may include a pair of rolls 102, 104, one of which is heated, is operated at a sufficient temperature to partially melt or soften the polymer sheet 16. As the polymer sheet 16 passes through a nip between the rolls, the pressure causes the particles 20 (and to some degree, the associated polymer material 34, 36) to become embedded in the sheet, as illustrated in FIG. 1.

The printed sheet thus formed is conveyed, by the transport mechanism 48, from the marking engine 50 to the stacker component 52, where an ordered stack 14 of sheets is formed (i.e., in a correct order for forming the shaped object 12), e.g., on a support member 22. The stack 14 is transferred, e.g., on a movable trolley 110, to a furnace 112, where the stack is converted to a ceramic/metallic object 12 through thermal and/or chemical degradation of the organic polymer materials and heating to a sintering temperature.

Figure 4:
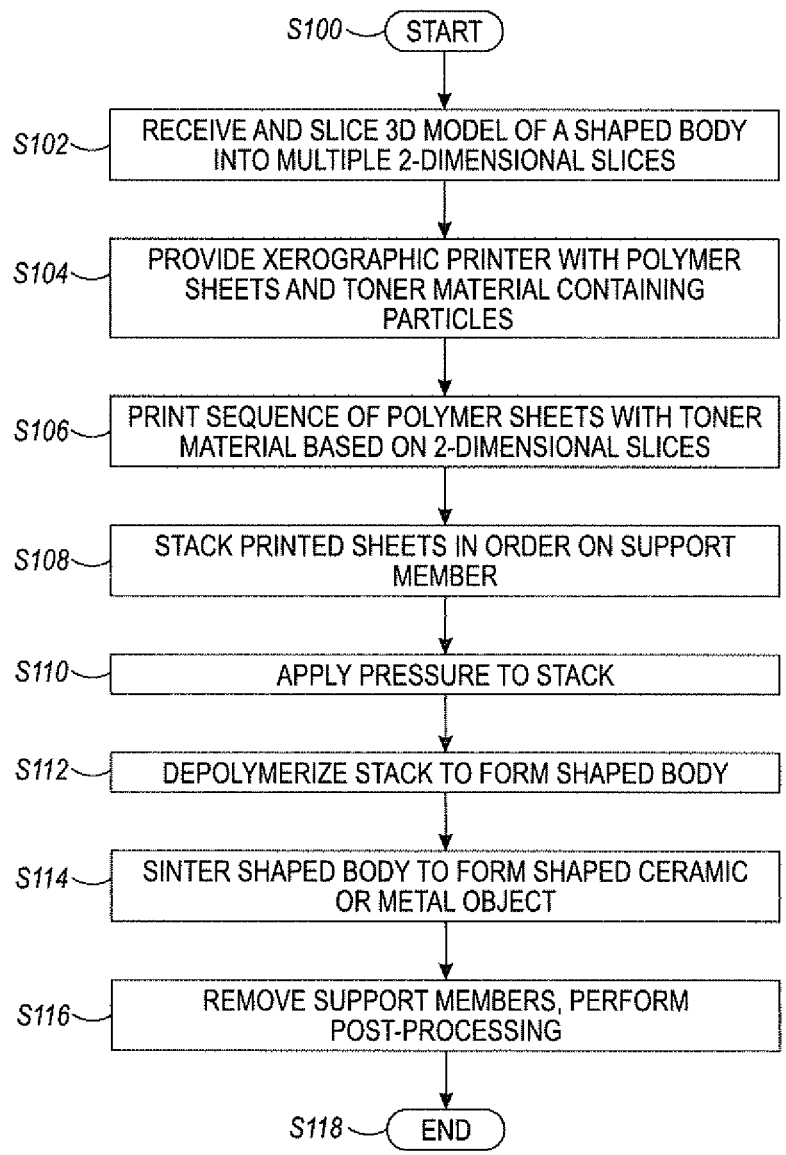
FIG. 4 illustrates a method for forming a shaped object in accordance with another aspect of the exemplary embodiment.

FIG. 4 illustrates a method of forming a shaped, e.g., ceramic object in accordance with the exemplary embodiment, which can be performed with the apparatus 40, 112 of FIG. 3. In the method, a toner material, which includes particles 20, is printed on polymeric sheets by xerographic printing. The method begins at S100.

At S102, a 3D model 68 of a shaped body (such as a ceramic object or green ceramic body, or several such objects, optionally with support members) is received into memory 60 and is sliced into 2-dimensional slices using suitable software. Each slice represents a print to be formed into the stack of printed sheets.

At S104 a xerographic printer 40 is provided which sheets 16, 18 of a decomposable polymeric material, such as POM, and a toner material 30 made of ceramic and/or metal particles 20 bound together with a binder containing a polymer, such as POM.

At S106, the toner material 30 is printed onto the sheets 16, 18 by xerographic printing, each slice of the 3D model corresponding to a respective toner image 82 on a respective sheet. For example, if the 3D model is sectioned into 50 slices, then 50 sheets are printed with toner images. A second toner material can be printed (analogous to a second color) onto each sheet. The second toner may contain no particles 20 and be used purely for internal and external support. The support evolves away during depolymerization. In other embodiments, the second toner material may include particles 20, such as ceramic-forming particles of a different type (e.g., alumina in the first toner material and boron nitride or tungsten in the second). The toner material has good charging characteristics due to the presence of the ceramic/metal particles, e.g., alumina particles. Most ceramics will work well in this regard as they are highly electrically resistive and have good tribo-charging properties.

At S108, the printed sheets are stacked using a conventional stacker 52, making sure that the sheets are aligned one on top of the other, e.g., on a support member 22.

At S110, the stacked sheets are clamped together, or pressure is otherwise applied.

At S112, the stack is depolymerized to form a solid shaped body, sometimes referred to as a green ceramic. In the case of POM, for example, this may include placing the stack 14 into a debinding oven, which may be the same as the furnace 112, or a separate, low temperature oven. The debinding oven heats the stack to coalesce the POM, then introduces a gaseous, acid-containing atmosphere of, for example, hydrogen halides, formic acid or nitric acid at elevated temperature, to catalytically debind the part. The POM binder and sheets chemically depolymerize in the nitric acid environment and evolve away as a gas, leaving behind a ceramic powder shape, which may be held together by residual wax. This process depolymerizes the polyoxymethylene homo- or copolymers without residue and may be followed by a thermal residual debinding of the remaining polymer at above the melting range of the residual binder. A certain level of plastic deformation of the powder molding may occur. The residual binder content after the catalytic removal of the first binder is generally about 10% and is thus lower than after a solvent debinding of the first binder, in which the residual binder content is typically 30 to 70%. A lower residual binder content has the advantage that the plastic deformation of the molding is typically less pronounced.

Catalytic depolymerization of POM with oxalic acid may also be used, as described in WO 94/25205. However, catalytic debinding with oxalic acid is much slower than with nitric acid. Also, the metered addition of oxalic acid in solid form is problematic. For aliphatic polyesters and/or polyethers, depolymerization may be performed with an alkaline gas, such as ammonia. In some cases, the polymer(s) components can be removed in a thermal depolymerization process at a suitable temperature for pyrolysis to occur.

At S114, the ceramic/metallic powder shape is fired at an appropriate temperature, schedule, and in an appropriate atmosphere to form the ceramic/metallic object. For example, the temperature may be ramped up to a temperature of about 350° C. and held to complete wax pyrolysis. Thereafter, the temperature is raised to a higher temperature to sinter the particles to form the shaped object 12. The atmosphere during firing may be air in the case of alumina. For other ceramics and metals, nitrogen, hydrogen, or a vacuum may be appropriate. For example, in the case of aluminum oxide, the body can be fired at 1610° C. for 2 to 4 hours in air to produce a fully dense ceramic body.

At S116, which may occur prior to or after S114, the supporting structures 26, 28 are removed. Some post-treatment of the shaped object may also be performed, such as polishing, assembly of two or more ceramic bodies to form a unitary body, or the like.

The method ends at S118.

The method allows for rapid prototyping of ceramic and metal objects. Assuming a xerographic printer is able to print at a rate of 180 pages per minute, this equates to about 9 mm per minute in the Z direction for sheets of about 0.05 mm thickness. The X and Y dimensions are limited only by the sheet size which can be handled by the printer (typically 11"×17" (~28×43 cm) or larger). This provides a significant improvement in the speed of forming ceramic/metal bodies over conventional 3D ceramic printers.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for forming a shaped object comprising:
sectioning a model of a shaped body into 2-dimensional slices;
for each slice, electrostatically printing a toner material on a respective flexible polymer sheet to form a printed sheet, the toner material comprising solid particles which form a ceramic or metal when sintered, the printing including feeding the polymer sheets from a print media source, which holds a supply of the polymer sheets, conveying the polymer sheets along a print media path to a marking engine where each polymer sheet is printed with a respective toner image, and fusing the toner image to the respective polymer sheet;
assembling the printed sheets one on top of the other into a stack, in the stack, each printed sheet comprising a respective polymer sheet and a toner image;

while applying pressure to the stack of printed sheets, depolymerizing the stack of printed sheets together to remove polymer of the polymer sheets from the stack; and sintering the depolymerized stack to form the shaped object.

2. The method of claim 1, wherein the particles in the toner material have an average diameter of less than 12 µm.

3. The method of claim 1, wherein the polymer sheets each have a thickness which is greater than an average diameter of the ceramic-forming particles.

4. The method of claim 1, wherein the polymer sheets have a thickness of at least 20 µm.

5. The method of claim 1, wherein the polymer sheets comprise at least one polymer selected from the group consisting of polyoxymethylene, polyvinyl alcohol, polystyrene, polyvinylidene fluoride, polyvinyl acetals, unsaturated polycarbonates, saturated polycarbonates, polyvinylpyrrolidone, vinyl imidazole copolymers, polyamides, polyethers, polyesters, cyclic olefin copolymers, polyolefins, polyacrylates, polymethacrylates, polyacrylonitrile, and copolymers and mixtures thereof.

6. The method of claim 1, wherein the solid particles comprise ceramic-forming particles which are formed of at last one refractory material selected from the group consisting of oxides, nitrides, carbides, hydroxides, silicates, and mixtures thereof.

7. The method of claim 6, wherein the ceramic-forming particles are formed of at least one refractory material selected from the group consisting of alumina, aluminum hydroxide, aluminum nitride, silica, titanium dioxide, calcium oxide, magnesium oxide, barium oxide, zirconia, silicon carbide, silicon nitride, boron carbide, precursors which decompose on heating to form such refractory materials, and mixtures and compounds thereof.

8. The method of claim 1, wherein the toner material comprises at least 40 wt. % of the solid particles.

9. The method of claim 1, wherein the toner material comprises at least 80 wt. % of the solid particles.

10. The method of claim 1, wherein the toner material comprises at least 5 wt. % of a binder material.

11. The method of claim 1, wherein the binder material includes an organic polymer and optionally a least one of a charge control agent and a flow control agent.

12. The method of claim 11, wherein the organic polymer in the binder is a same polymer as in the polymer sheets.

13. The method of claim 1, wherein the depolymerizing includes chemically depolymerizing the stack in a gaseous, acid-containing atmosphere.

14. The method of claim 1, wherein the depolymerizing includes applying pressure to the stack.

15. The method of claim 1, wherein the stack includes at least 10 of the printed sheets.

16. The method of claim 1, wherein the polymer sheets comprise at least one of a polyoxymethylene homopolymer and a polyoxymethylene copolymer.

17. A method for forming a ceramic object comprising:
providing a print file in which a model of a ceramic body has been sectioned into 2-dimensional slices;
for each slice, printing a toner material on a polymer sheet to form a respective printed sheet, the toner material comprising at least 40 wt. % ceramic-forming particles and a binder comprising a polymer, the polymer sheet comprising at least one of a polyoxymethylene homopolymer and a polyoxymethylene copolymer;
assembling the printed sheets comprising the polymer sheets printed with toner material into a multilayer stack of printed sheets; and
depolymerizing the multilayer stack of printed sheets together to remove the polymer sheets; and
sintering the depolymerized stack to form the ceramic object.

18. The method of claim 17, wherein: the polymer in the binder comprises at least one of a polyoxymethylene homopolymer and a polyoxymethylene copolymer.

* * * * *